UNITED STATES PATENT OFFICE.

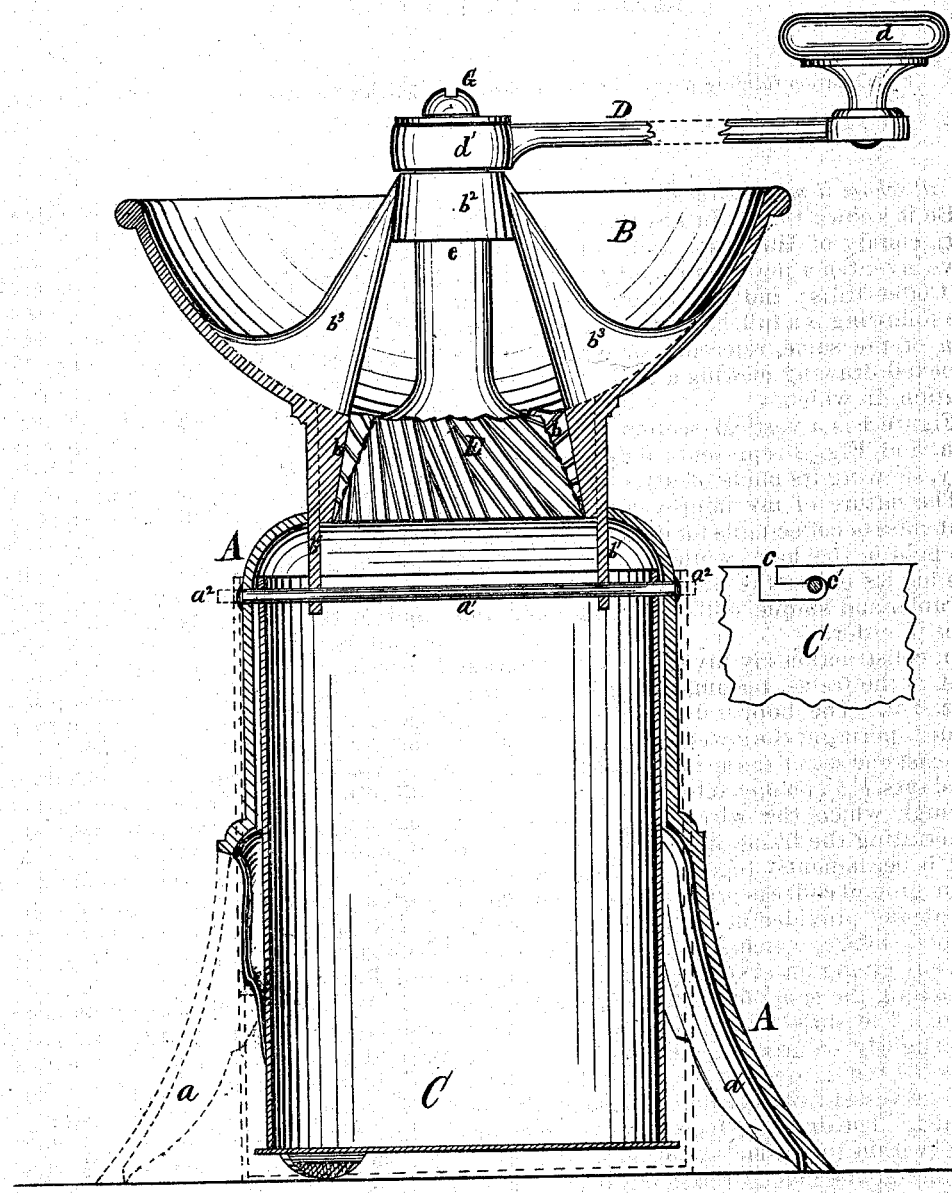

LUI SCHULZ, OF CINCINNATI, OHIO.

IMPROVEMENT IN COFFEE-MILLS.

Specification forming part of Letters Patent No. 139,824, dated June 10, 1873; application filed April 5, 1873.

*To all whom it may concern:*

Be it known that I, LUI SCHULZ, of Cincinnati, county of Hamilton and State of Ohio, have invented a new and useful Improvement in Coffee-Mills; and I do hereby declare that the following is a full, clear, and exact description of the same, reference being had to the annexed drawing making a part of this specification, in which—

Figure 1 is a vertical section of my invention, and Fig. 2 represents a portion of the tray, showing its mode of attachment.

The nature of my improvement relates to that class of coffee-mills for domestic use which are held in the hand while in operation, and has for its object the production of compact, durable, and simple mill, easily adjusted and kept in order.

In construction my invention is as follows: A A is the frame, terminating below in three legs, $a\ a$. The hopper B has its interior, $b$, made tapering at the lower extremity, on which are cast one set of the grinding-teeth, and two pendants, $b^1\ b^1$, on opposite sides to each other, through which the wire-pin $a^1$ passes after penetrating the frame A, holding the parts A and B permanently together. The receptacle C for ground coffee is preferably made of sheet metal, and provided at its mouth with two L-shaped slots, $c$, which engage with the pin $a^1$, thereby giving an easy means of attaching or detaching the same from the mill when so desired. The slots $c$ at their lower extremity are slightly enlarged, as seen at $c'$, which allows the pin $a^1$ to enter the same, thus securing the vessel from becoming accidentally detached. The drawing represents the receptacle C within the frame A, but may, with equal advantage, be made to pass on the outside of the body of frame A, by extending the pin $a^1$ as shown by the dotted lines at $a^2$, and dispensing with legs $a\ a$, allowing the bottom of vessel C to serve as the base. The journal-bearing $b^2$ is cast in one piece with the hopper, by the intervention of two or more supporting braces or ribs, $b^3\ b^3$. These ribs extend up the side of the hopper some distance at their point of attachment, and gradually curve as they approximate the bearing $b^2$, having their upper edges brought to a feather-edge for the purpose of preventing the last grains of coffee to be ground from clogging in the hopper. The crank D terminates in the handle $d$, as in ordinary cases. It is provided with a square eye, $d'$, which passes snugly over a square shank on the grinder E. A small washer, F, having been placed over the shank $e$, an ordinary machine-screw, G, is driven into the end of shank $e$, holding the crank firmly in place, and at the same time gives a certain amount of adjustment of parts E and $b$, by raising or lowering the said screw G.

The operation of my invention becomes obvious from the foregoing description. Among the advantages of my improved mill may be mentioned its simplicity; its not permitting any waste of coffee from defective fitting the receptacle C with the mill; its not clogging, or permitting the last grains to hang to the ribs $b^3$; and the ease with which it may be adjusted without the use of a wrench.

Having thus described my invention, what I claim as new, and desire to secure by Letters Patent, is—

1. In a coffee-mill, the combination of the receiving-vessel C having a slot, $c$, enlarged at $c'$, frame A, and hopper B, connected together by pin $a^1$, substantially as set forth.

2. In a coffee-mill, the curved and feathered-edged ribs $b^3$ in combination with the hopper B, and journal, $b^2$, substantially as set forth.

LUI SCHULZ.

Attest:
T. VAN KANNEL,
J. B. CORBIN.